S. PIERCE.
Domestic Oven.

No. 18,297.

Patented Sept. 29, 1857.

UNITED STATES PATENT OFFICE.

SAMUEL PIERCE, OF TROY, NEW YORK.

APPARATUS FOR ROASTING ON COOKING STOVES, RANGES, &c.

Specification of Letters Patent No. 18,297, dated September 29, 1857.

*To all whom it may concern:*

Be it known that I, SAMUEL PIERCE, of Troy, in the county of Rensselaer and State of New York, have invented a new and useful Apparatus for Roasting Meat to be Combined with a Stove or Cooking Range; and I do hereby declare the following to be a full, clear, and exact description thereof, referring to the accompanying drawing, in which—

Figure 1:
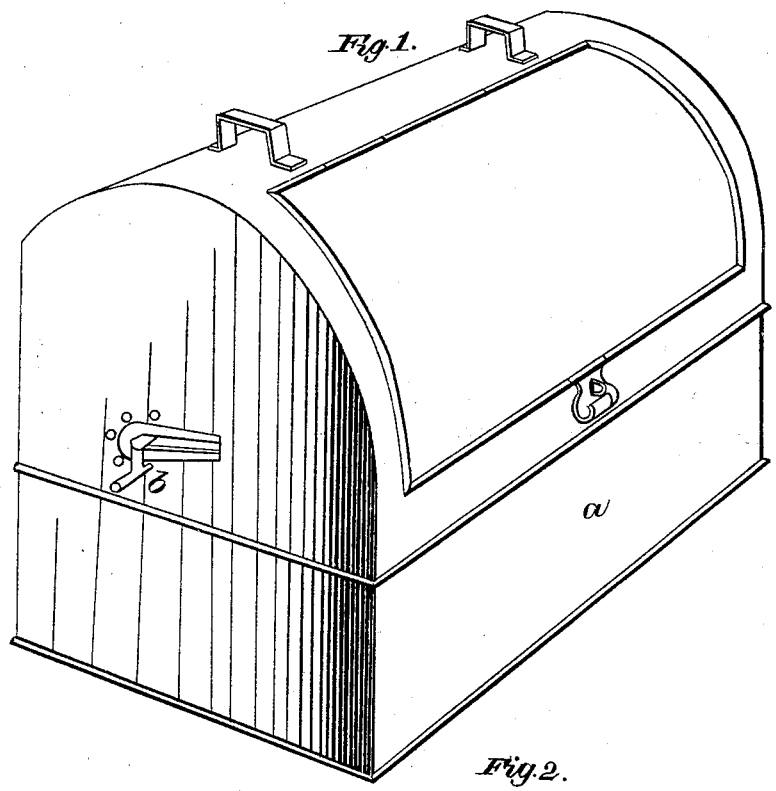
Figure 2:
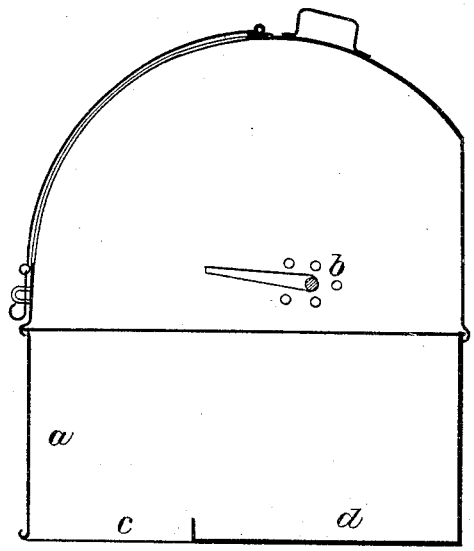

Figure 1 is a general view. Fig. 2 is a section of the apparatus.

My device is for the purpose of roasting meats by reflected heat as is usual in the ordinary process before a fire in the old fashioned tin kitchen availing myself of the heat therefor from the modern cooking range or stove but avoiding the defects of baking as generally practiced.

The construction is as follows: I form a bright tin kitchen somewhat as in the shape of the ordinary article before in use the difference being that I bring a curtain of tin down in front at *a* to the bottom instead of leaving it open at that point I insert a spit in the usual way at *b* and under it there is the usual dripping-pan arrangement *d* beyond which a space *c* is left between said dripping pan *d* and the front curtain *a*, as clearly seen in the drawing.

The roaster is furnished with handles and door for basting as other articles of similar character.

To cook with this improved device after the meat to be roasted is put on the spit and placed in the roaster the roaster is set onto the top of the stove directly over the fire chamber the griddles or covers being implaced or otherwise. The heat from the top of the fire chamber is radiated upward striking the curved top of the roaster and is reflected directly onto the meat to be roasted where the heat is all concentered for that purpose the curve of the top being such as to produce this effect. I thus obtain the advantage of roasting by a range or stove as perfectly as by an open fire, save the baking room of the ovens and attain a portable roaster cheap and simple in its operation combined with all the other advantages of modern cooking apparatus while the defects of baking meats are avoided.

I am aware that some attempts have been made to roast on the top of a cooking stove but they were always attended with a complexity of apparatus fatal to its introduction such as a contrivance receiving the heat under its whole bottom with a pipe leading off into the smoke pipe; and baking where there was no circulation has been frequently done on the top of stoves. My device differs materially from these in the following particulars, there is a gravy pan forming a part of my apparatus, which sits off over the side of the stove, and by which the gravy in roasting can be saved from rapid evaporation, and by means of the direct opening with the flue of the stove, through the openings above the fire, as free a circulation is kept up within the roaster as there is in the ordinary open tin kitchen, and all the difference is made between roasting and baking by this simple device.

Having thus fully described my roasting apparatus what I claim therein and desire to secure by Letters Patent is—

The construction and arrangement of the apparatus as above specified for the purpose of combining with a range or stove for the purpose of roasting as herein set forth.

SAMUEL PIERCE.

Witnesses:
W. H. STANSBURY,
EDWARD CLARK.